(12) United States Patent
McDonald et al.

(10) Patent No.: US 9,134,793 B2
(45) Date of Patent: Sep. 15, 2015

(54) HEADSET COMPUTER WITH HEAD TRACKING INPUT USED FOR INERTIAL CONTROL

(71) Applicant: Kopin Corporation, Taunton, MA (US)

(72) Inventors: Lee McDonald, Nottinghamshire (GB); Jeffrey J. Jacobsen, Hollister, CA (US); Stephen A. Pombo, Campbell, CA (US); Christopher Parkinson, Richland, WA (US)

(73) Assignee: Kopin Corporation, Westborough, MA (US)

( * ) Notice: Subject to any disclaimer, the term of this patent is extended or adjusted under 35 U.S.C. 154(b) by 141 days.

(21) Appl. No.: 13/799,818

(22) Filed: Mar. 13, 2013

(65) Prior Publication Data

US 2014/0191964 A1 Jul. 10, 2014

Related U.S. Application Data

(60) Provisional application No. 61/748,761, filed on Jan. 4, 2013.

(51) Int. Cl.
*G09G 5/08* (2006.01)
*G06F 3/038* (2013.01)
*G06F 3/01* (2006.01)
(Continued)

(52) U.S. Cl.
CPC ............. *G06F 3/011* (2013.01); *G02B 27/017* (2013.01); *G06F 3/012* (2013.01); *G06F 3/0346* (2013.01); *G06F 3/0485* (2013.01);
(Continued)

(58) Field of Classification Search
None
See application file for complete search history.

(56) References Cited

U.S. PATENT DOCUMENTS 5,526,022 A * 6/1996 Donahue et al. ............... 345/156
5,742,263 A * 4/1998 Wang et al. ....................... 345/8
(Continued)

FOREIGN PATENT DOCUMENTS

WO  WO 95/21408   8/1995
WO  WO 95/23994   9/1995
(Continued)

OTHER PUBLICATIONS

Notification of Transmittal of International Search Report and Written Opinion of PCT/US2013/066071 dated Feb. 27, 2014, entitled "A Headset Computer With Head Tracking Input Used for Inertial Control".

(Continued)

*Primary Examiner* — Peter Vincent Agustin
(74) *Attorney, Agent, or Firm* — Hamilton, Brook, Smith & Reynolds, P.C.

(57) ABSTRACT

A Head-tracker is built into a headset computer as a user input device. A user interface navigation tool utilizes the head tracking but with inertial control. The navigation tool is formed of two different sized circles concentrically depicted, and a pointer. The pointer is moveable within the two circles defining inner and outer boundaries. The pointer represents user's head position and movement sensed by the head tracker. The HSC displays a document and pans (navigates) the document as a function of user head movement sensed by the head tracker and illustrated by the navigation tool. The direction of movement of the pointer depicted in the navigation tool defines pan direction of the displayed document. Pan speed of the displayed document is defined based on position of the pointer, with respect to the inner and outer circle boundaries in the navigation tool.

4 Claims, 8 Drawing Sheets

(51) Int. Cl.
    *G06F 3/0485* (2013.01)
    *G02B 27/01* (2006.01)
    *G06F 3/0346* (2013.01)
    *G06F 3/0481* (2013.01)

(52) U.S. Cl.
    CPC ..... *G06F 3/04812* (2013.01); *G02B 2027/014* (2013.01); *G02B 2027/0187* (2013.01)

(56) References Cited

U.S. PATENT DOCUMENTS

| | | | |
|---|---|---|---|
| 5,990,793 A | 11/1999 | Bieback | |
| 6,010,216 A | 1/2000 | Jesiek | |
| 6,067,069 A * | 5/2000 | Krause | 345/685 |
| 6,084,556 A * | 7/2000 | Zwern | 345/8 |
| 6,108,197 A | 8/2000 | Janik | |
| 6,204,974 B1 | 3/2001 | Spitzer | |
| 6,325,507 B1 | 12/2001 | Jannard | |
| 6,421,064 B1 * | 7/2002 | Lemelson et al. | 345/688 |
| 6,424,410 B1 * | 7/2002 | Pelosi | 356/139.03 |
| 6,798,391 B2 | 9/2004 | Peterson, III | |
| 6,798,443 B1 * | 9/2004 | Maguire, Jr. | 348/121 |
| 6,853,293 B2 | 2/2005 | Swartz et al. | |
| 6,900,777 B1 | 5/2005 | Hebert et al. | |
| 6,922,184 B2 | 7/2005 | Lawrence et al. | |
| 6,956,614 B1 | 10/2005 | Quintana et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,458,682 B1 | 12/2008 | Lee | |
| 7,461,936 B2 | 12/2008 | Jannard | |
| 7,494,216 B2 | 2/2009 | Jannard et al. | |
| 7,512,414 B2 | 3/2009 | Jannard et al. | |
| 7,620,432 B2 | 11/2009 | Willins et al. | |
| 7,682,018 B2 | 3/2010 | Jannard | |
| 7,740,353 B2 | 6/2010 | Jannard | |
| 7,744,213 B2 | 6/2010 | Jannard et al. | |
| 7,753,520 B2 | 7/2010 | Fuziak, Jr. | |
| 7,760,898 B2 | 7/2010 | Howell et al. | |
| 7,798,638 B2 | 9/2010 | Fuziak, Jr. | |
| 7,806,525 B2 | 10/2010 | Howell et al. | |
| 7,918,556 B2 | 4/2011 | Lewis | |
| 7,959,084 B2 | 6/2011 | Wulff | |
| 7,966,189 B2 | 6/2011 | Le et al. | |
| 7,967,433 B2 | 6/2011 | Jannard et al. | |
| 7,969,383 B2 | 6/2011 | Eberl et al. | |
| 7,969,657 B2 | 6/2011 | Cakmakci et al. | |
| 7,976,480 B2 | 7/2011 | Grajales et al. | |
| 7,988,283 B2 | 8/2011 | Jannard | |
| 7,997,723 B2 | 8/2011 | Pienimaa et al. | |
| 8,010,156 B2 | 8/2011 | Warren | |
| 8,020,989 B2 | 9/2011 | Jannard et al. | |
| 8,025,398 B2 | 9/2011 | Jannard | |
| 8,072,393 B2 | 12/2011 | Riechel | |
| 8,092,011 B2 | 1/2012 | Sugihara et al. | |
| 8,098,439 B2 | 1/2012 | Amitai et al. | |
| 8,123,352 B2 | 2/2012 | Matsumoto et al. | |
| 8,140,197 B2 | 3/2012 | Lapidot et al. | |
| 8,212,859 B2 | 7/2012 | Tang et al. | |
| 2002/0015008 A1 | 2/2002 | Kishida et al. | |
| 2002/0094845 A1 | 7/2002 | Inasaka | |
| 2003/0020755 A1 * | 1/2003 | Lemelson et al. | 345/786 |
| 2003/0068057 A1 | 4/2003 | Miller et al. | |
| 2005/0264527 A1 | 12/2005 | Lin | |
| 2006/0132382 A1 | 6/2006 | Jannard | |
| 2008/0198324 A1 | 8/2008 | Fuziak | |
| 2008/0309626 A1 | 12/2008 | Westerman et al. | |
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2010/0020229 A1 | 1/2010 | Hershey et al. | |
| 2010/0033830 A1 | 2/2010 | Yung | |
| 2010/0053069 A1 | 3/2010 | Tricoukes et al. | |
| 2010/0121480 A1 | 5/2010 | Stelzer et al. | |
| 2010/0171680 A1 | 7/2010 | Lapidot et al. | |
| 2010/0238184 A1 | 9/2010 | Janicki | |
| 2010/0259471 A1 * | 10/2010 | Takano et al. | 345/156 |
| 2010/0271587 A1 | 10/2010 | Pavlopoulos | |
| 2010/0277563 A1 | 11/2010 | Gupta et al. | |
| 2010/0289817 A1 | 11/2010 | Meier et al. | |
| 2010/0325575 A1 * | 12/2010 | Platzer et al. | 715/781 |
| 2011/0001699 A1 | 1/2011 | Jacobsen et al. | |
| 2011/0089207 A1 | 4/2011 | Tricoukes et al. | |
| 2011/0090135 A1 | 4/2011 | Tricoukes et al. | |
| 2011/0214082 A1 | 9/2011 | Osterhout et al. | |
| 2011/0221669 A1 | 9/2011 | Shams et al. | |
| 2011/0221671 A1 | 9/2011 | King, III et al. | |
| 2011/0227812 A1 | 9/2011 | Haddick et al. | |
| 2011/0227813 A1 | 9/2011 | Haddick et al. | |
| 2011/0254698 A1 | 10/2011 | Eberl et al. | |
| 2011/0255050 A1 | 10/2011 | Jannard et al. | |
| 2011/0273662 A1 | 11/2011 | Hwang et al. | |
| 2012/0013843 A1 | 1/2012 | Jannard | |
| 2012/0026071 A1 | 2/2012 | Hamdani et al. | |
| 2012/0056846 A1 | 3/2012 | Zaliva | |
| 2012/0062444 A1 * | 3/2012 | Cok et al. | 345/8 |
| 2012/0062445 A1 | 3/2012 | Haddick et al. | |
| 2012/0105740 A1 | 5/2012 | Jannard et al. | |
| 2012/0114131 A1 | 5/2012 | Tricoukes et al. | |
| 2012/0188148 A1 * | 7/2012 | DeJong | 345/8 |
| 2012/0188245 A1 | 7/2012 | Hyatt | |
| 2012/0236025 A1 * | 9/2012 | Jacobsen et al. | 345/629 |
| 2014/0191964 A1 * | 7/2014 | McDonald et al. | 345/158 |

FOREIGN PATENT DOCUMENTS

| | | |
|---|---|---|
| WO | WO 00/79327 | 12/2000 |
| WO | WO 2009/076016 | 6/2009 |
| WO | WO 2011/051660 | 5/2011 |
| WO | WO 2012/040386 | 3/2012 |

OTHER PUBLICATIONS

International Preliminary Report on Patentability for PCT/US2013/066071 dated Jul. 16, 2015 entitled "A Headset Computer With Head Tracking Input Used For Inertial Control".

* cited by examiner

HEADSET COMPUTER WITH HEAD TRACKING INPUT USED FOR INERTIAL CONTROL

RELATED APPLICATION

This application claims the benefit of U.S. Provisional Application No. 61/748,761, filed on Jan. 4, 2013. The entire teachings of the above application(s) are incorporated herein by reference.

BACKGROUND OF THE INVENTION

Mobile computing devices, such as notebook PCs, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers seek a hands-free high-quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to either eyeglasses, audio headset or video eyewear. A "wireless computing headset" device includes one or more small high-resolution micro-displays and optics to magnify the image. The WVGA microdisplay's can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility through hands dependent devices. For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

In one embodiment of the present invention relates to viewing documents on near eye display computing devices (e.g., a HMC (Head-Mounted Computer) or HSC (Headset Computer)). A HSC can be provided with a document navigator employing inertial control. A HSC can be provided with a document navigator employing inertial control. Typically once a HSC loads and displays a document in the document navigator, the built-in head-tracker functionality allows head-movement as user input to control navigation in the displayed document.

In one embodiment, the document navigator can employ 'one-to-one' head-tracking 'One-to-one' head-tracking panning is effective at navigating documents up to 11"×15" (A3) size. When navigating documents larger than 11"×15" (A3), one-to-one head tracking requires a large amount of head movement to move from one corner of the document to the other.

In one embodiment, a method of controlling document navigation in a headset computer can include overlaying a navigator tool on a subject document displayed on the headset computer being worn by a user. The method can further include indicating, at the navigator tool and in response to received head movement of the user at the headset computer, a representation of the received head movement. The method additionally can include panning the subject document at a speed and in a direction based on the received head movement.

In another embodiment, overlaying the navigator tool can include overlaying an inner boundary and an outer boundary. The inner boundary and outer boundary can be concentric circles having different diameters. Overlaying the navigator tool can further overlay a pointer configured to move within the inner and outer boundaries. Indicating the representation of the received head movement can include indicating the representation by positioning the pointer with respect to the origin of the two circles. Panning the subject document can further include panning the subject document based on a location where the pointer resides outside the inner boundary. Panning the subject document can further include presenting a same viewpoint of the subject document where the pointer resides inside the inner boundary. Panning the subject document can further include panning the subject document at the speed based on a distance from the origin. The speed can be further based on a distance from the origin minus a radius of the inner boundary. The speed can increase as the distance from the origin increase. The speed can be at a maximum when the pointer is at the outer boundary. Panning the subject document can include panning the subject document horizontally when the representation is within a particular threshold of being horizontal, and panning the subject document vertically when the representation is within a particular threshold of being vertical.

The representation of the head movement is based on a relative extent of the head movement. The relative extent of the head movement can represent an amount of degrees that the user's head has turned in along a given axis or multiple axes. The relative extent can have a maximum number of degrees.

In another embodiment, a system for controlling document navigation in a headset computer can include a display and a navigator tool module. The navigator tool module can be configured to (a) overlay a navigator tool on a subject document displayed on the display of the headset computer being worn by a user, (b) indicate, at the navigator tool and in response to received head movement of the user at the headset computer, a representation of the received head movement, and (c) pan the subject document at a speed and in a direction based on the received head movement.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
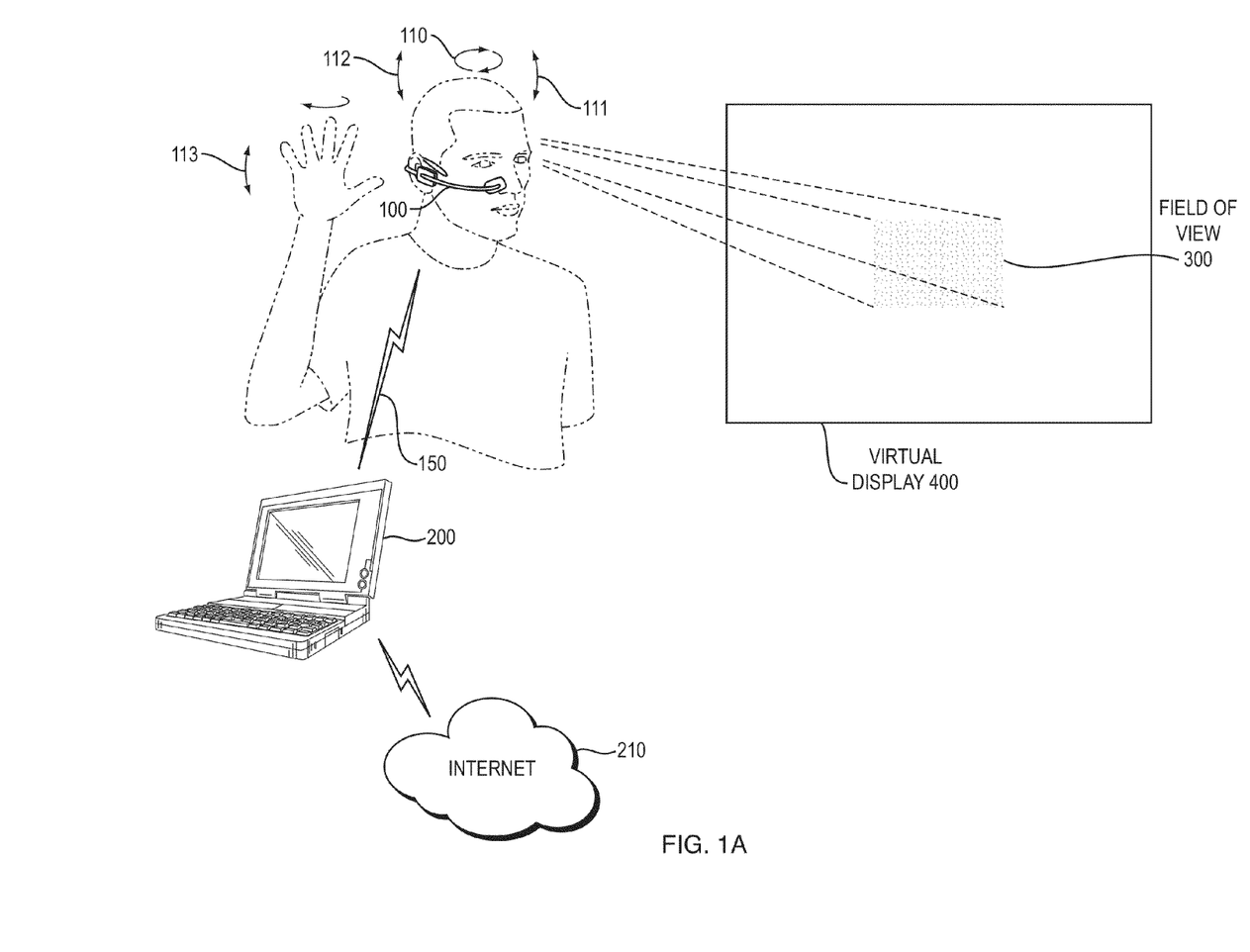
FIGS. 1A-1B are schematic illustrations of a headset computer cooperating with a host computer (e.g., Smart Phone, laptop, etc.) according to principles of the present invention.
Figure 1B:
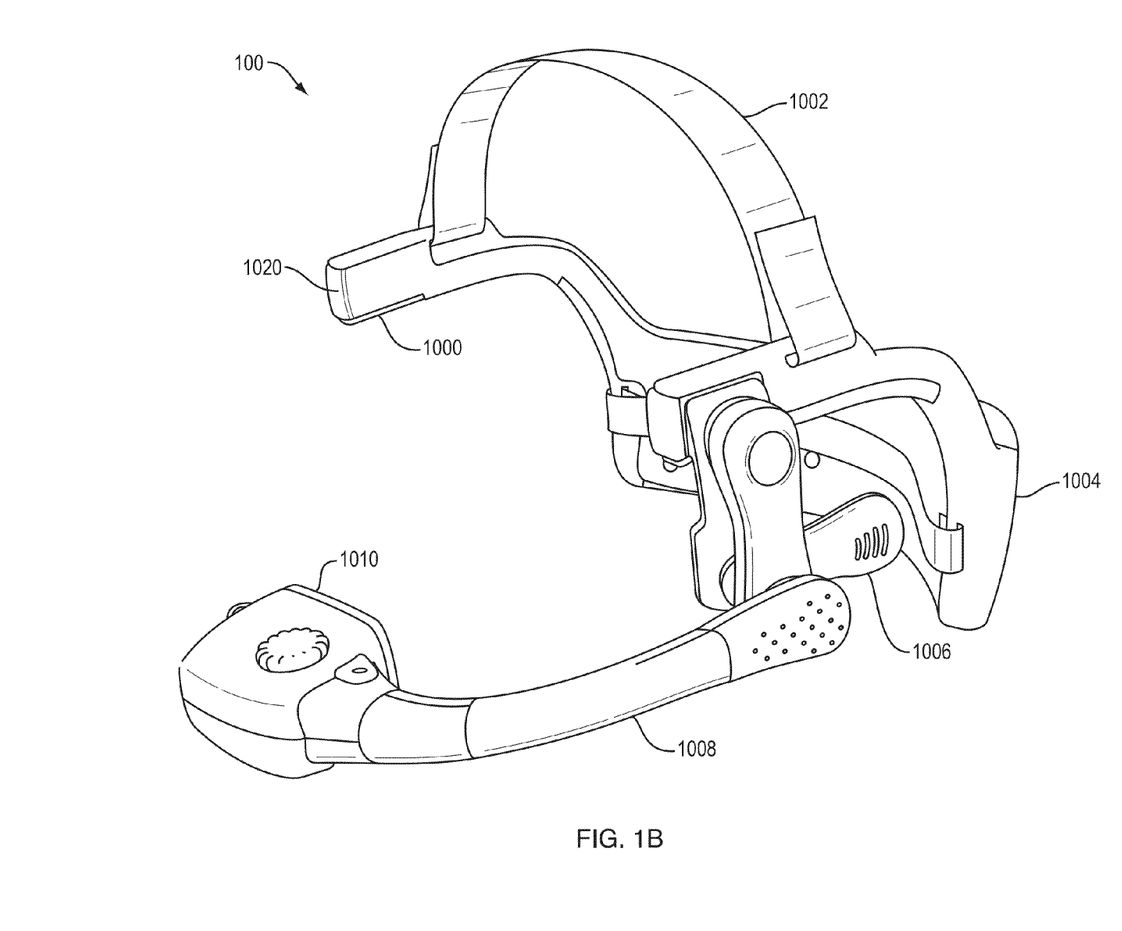

FIGS. 1A and 1B show an example embodiment of a wireless computing headset device 100 (also referred to herein as a headset computer (HSC) or head mounted computer (HMC)) that incorporates a high-resolution (VGA or better) microdisplay element 1010, inertia producing head tracking and other features described below. HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 1B). Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. Microphone(s) operatively coupled or preferably integrated into the HSC 100 can be used to capture speech commands which are then digitized and processed using automatic speech recognition techniques. Gyroscopes, accelerometers, and other micro-electromechanical system sensors can be integrated into the HSC 100 and used to track the user's head movement to provide user input commands. Cameras or other motion tracking sensors can be used to monitor a user's hand gestures for user input commands. Such a user interface overcomes the hand-dependent formats of other mobile devices.

The headset computing device 100 can be used in various ways. It can be used as a remote display for streaming video signals received from a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The host may be further connected to other networks 210, such as the Internet. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033.) In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Microdisplay subassembly 1010 is used to render visual information to the user. It is coupled to the arm 1008. The arm 1008 generally provides physical support such that the microdisplay subassembly is able to be positioned within the user's field of view 300 (FIG. 1A), preferably in front of the eye of the user or within its peripheral vision preferably slightly below or above the eye. Arm 1008 also provides the electrical or optical connections between the microdisplay subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A-1B is a monocular microdisplay presenting a single fixed display element supported on the face of the user with a cantilevered boom, it should be understood that other mechanical configurations for the remote control display device 100 are possible.

Figure 2:
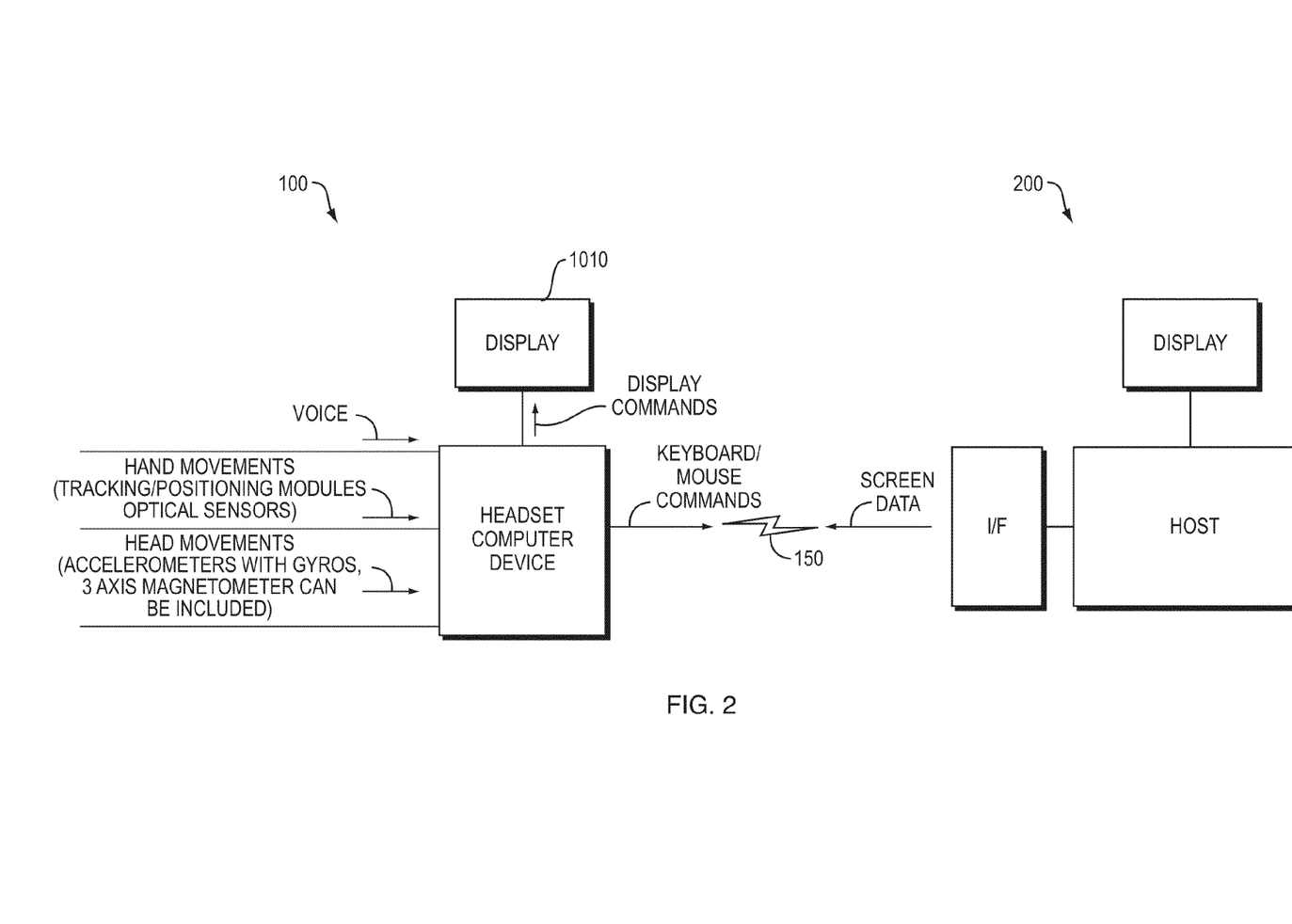
FIG. 2 is a block diagram of flow of data and control in the embodiment of FIGS. 1A-1B.

FIG. 2 is a block diagram showing more detail of the HSC device 100, host 200 and the data that travels between them. The HSC device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software in the HSC device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC device 100.

The document navigator of an embodiment of the present invention provides for utilizing head tracking with the addition of inertial control. The user interface of the document navigator includes two concentric circles, and a pointer, which can be, for example, a dot or other shape. The pointer represents the position of the head tracker. The pointer can move anywhere within the two circles.

The navigator, using the position of the pointer, enables the user to control the navigation speed around the document. The user can navigate the document in any direction (0-360 degrees). Instead of one-to-one head tracking, which directly correlates movement of the head to document movement (traversal direction or path), the document navigator enables the user to move his or her head in limited movements, but still enables full panning of the document.

If the user wants to move the current view directly horizontally or directly vertically on the four axes of location (up, down, left and right) the document navigator affords a reasonable degree of tolerance so that if the user doesn't move the cursor directly horizontally or directly vertically through the centre of the circle, the document moves only along the horizontal or vertical axis.

The respective sizes of the two circles are preferably fixed and circle sizes do not vary depending upon the size of the subject document. In one embodiment, the user can vary the sizes of the circles by adjusting the settings.

In one embodiment the HSC 100 may take the form of the HSC described in a co-pending US Patent Publication Number 2011/0187640 which is hereby incorporated by reference in its entirety.

In another embodiment, the document tracker relates to the concept of using a Head Mounted Display (HMD) 100 in conjunction with an external 'smart' device 200 (such as a smartphone or tablet) to provide information and control to the user hands-free. The document navigator transmits small amounts of data, providing a more reliable data transfer method running in real-time.

In this sense therefore, the amount of transmitted data over the connection 150 is small. Transmitted data includes instructions on how to lay out a screen, text to display, and other stylistic information including drawing arrows, background colours, or images to include, etc.

Additional data can be streamed over the same wireless interface 150 or other connection and displayed on screen 1010, such as a video stream if required by the Controller 200.

In embodiments, the document navigator receives input from an accelerometer or similar movement based sensing array based inside the HMC 100, 1004. The navigator uses the values to determine how far, and in what direction, the navigation dot should move. The position of the navigation dot is then used to calculate how (e.g., direction) and speed the document shown on the screen should move.

The document navigation displays three items:

(1) A navigation dot/pointer represents the current display 'position' of the user within the navigator's boundaries.

(2) An inner (or central) boundary that is a 'safe' zone, so that if the navigation dot remains within the inner boundary then the document does not move. Once the navigation dot leaves the inner boundary in any direction, the document begins moving in the same direction that the navigation dot exited the inner boundary.

(3) An Outer Boundary acts as a wall to stop the user from 'losing' the navigation dot. The outer boundary is adjusted so that head movements to reach all maximum and minimum values are comfortable to the user. If the navigation dot is at a maximum point on the outer boundary then all deltas received from the sensing devices that would move the navigation dot outside of the outer boundary are ignored.

The document navigator determines the speed at which the document scrolls based on the distance that the navigation dot is from the inner boundary. The closer the navigation dot is to the outer boundary, the faster the document scrolls. The user can control the direction that the document pans in through the position of the pointer relative to the origin (center) of the navigator boundaries, and also can control the pan speed through the position of the pointer with respect to the inner and outer circles (boundaries). The document virtually moves in the opposite direction to the movement of the pointer. To the user, the document appears to 'pan' in the same direction as the pointer has moved. In other words, if the document is moving left-to-right, the panning appears to the user as moving right-to-left.

There is a small window on screen of micro display 1010 that shows the user his or her current display position within the document by showing a thumbnail of the whole document while highlighting the region shown to the user. For larger documents, the user can see the context of the whole document while viewing only part, on micro display 1010 and using the navigator to pan around the document.

The speed of panning (when moving between the two circles with the pointer) can be modified for each headset computer application.

The Document Viewer is an application on headset computer 100 that allows the user to navigate large documents, pictures, or spreadsheets. With the Document Viewer, the user can view A1 (594×841 mm) A0 (841×1189 mm) and other sized documents.

The Document Viewer employs the document navigator to move around a document. The document viewer also allows the user to (1) zoom in and zoom out of the document, (2) freeze and un-freeze document movement (e.g., via a voice or other command), and (3) navigate between pages.

With the Document Navigator incorporated within the Document Viewer the user can view and navigate documents easily. The document navigator simplifies navigating around blueprints and technical schematic drawings.

Figure 3:
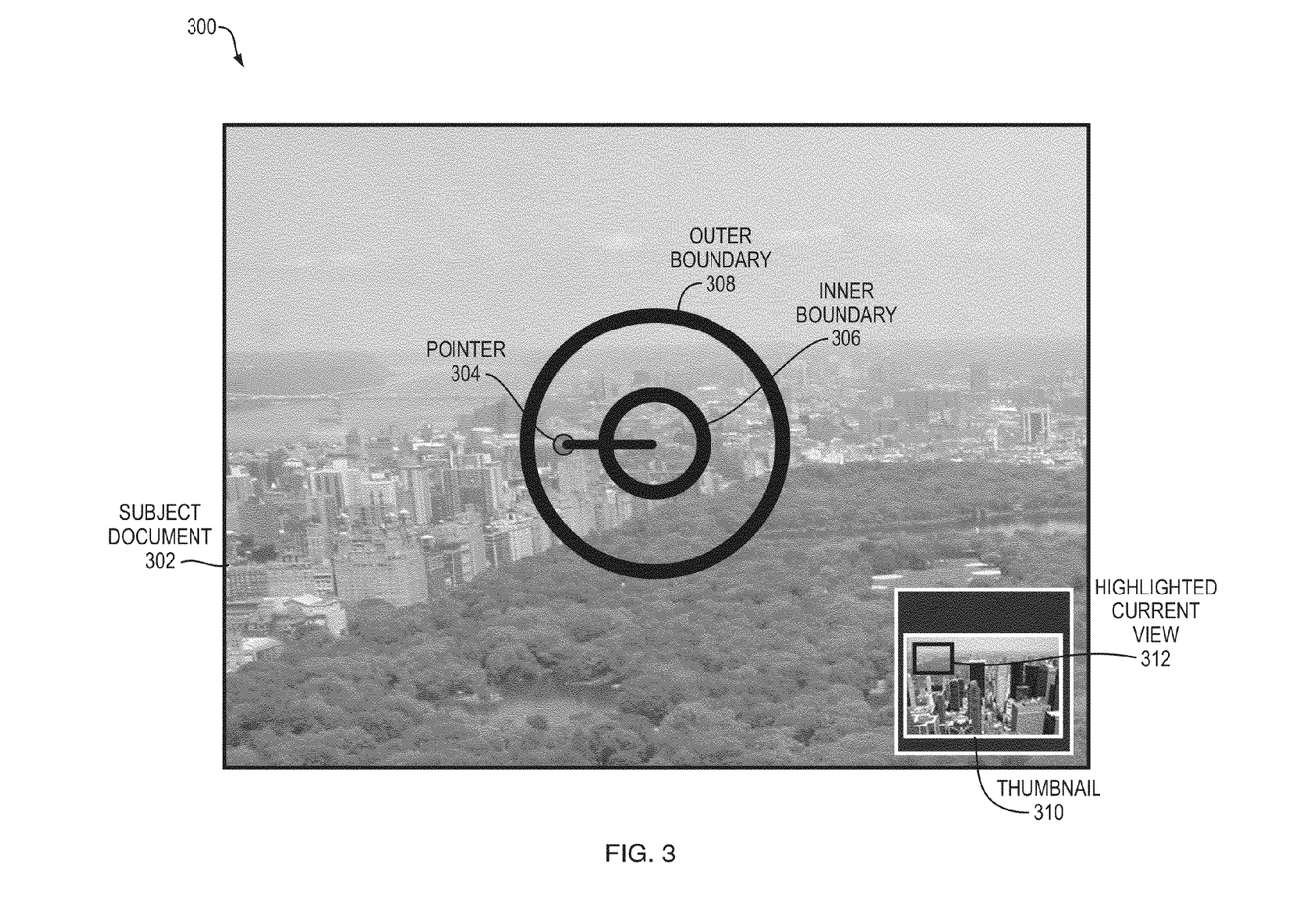
FIG. 3 is a user interface diagram illustrating an example embodiment of the Document Navigator within the Document Viewer application viewing a subject document on headset computer.

FIG. 3 is a user interface diagram 300 illustrating an example embodiment of the Document Navigator within the Document Viewer application viewing a subject document 302 on headset computer 100. A pointer 304 is within an inner boundary 306 and outer boundary 308. The pointer 304 adjusts its location within the inner boundary 306 and outer boundary 308 based on the direction the user's head is turned. For example, the pointer 304 moves to the left when the user looks to the left, moves up when the user looks upward, moves right when the user looks to the right, and moves down when the user looks downward. When the user is looking straight ahead, the pointer 304 is at the origin of the outer boundary 308 and inner boundary 306, which are concentric circles in this embodiment.

When the pointer 304 is within the outer boundary 308 and outside of the inner boundary 306, the document scrolls in the direction of the pointer 304. The further the pointer 304 moves outside the inner boundary 306, the faster the document scrolls. For example, if the distance of the pointer from the origin is represented by $r_p$, and the radius of the inner boundary is represented by $r_{ib}$, the speed of scrolling can be proportional to $r_p-r_{ib}$.

In addition, the pointer 304 does not move outside of the outer boundary 308. In other words, the outer boundary 308 sets a maximum scrolling speed. Even if the user moves his or her head further, the pointer 304 does not move outside the outer boundary 308, and the speed of scrolling remains the same. If the radius of the outer boundary is represented by $r_{ob}$, the speed of scrolling can be proportional to $\min(r_p,r_{ob})-r_{ib}$.

The Document Navigator also displays a thumbnail 310 of the subject document 302. The thumbnail 310 shows a highlighted current view 312, which outlines or highlights the zoomed in view currently displayed to the user. As the user scrolls around the document, the highlighted current view 312 moves in real time around the thumbnail 310.

Figure 4:
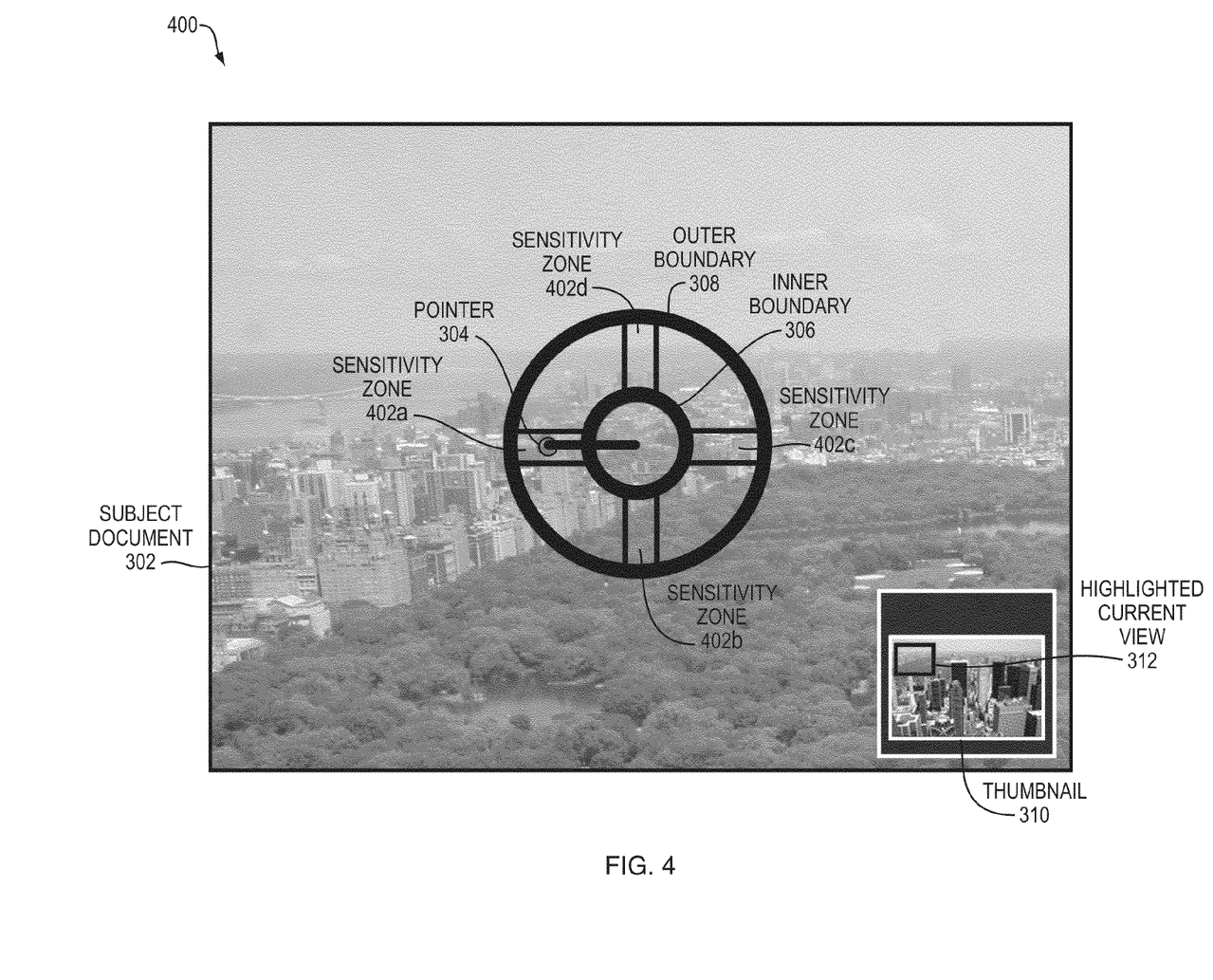
FIG. 4 is a user interface diagram illustrating an example embodiment of the document navigator employing sensitivity zones.

FIG. 4 is a user interface diagram 400 illustrating an example embodiment of the document navigator employing sensitivity zones 402a-d. When the pointer 304 is within one of the sensitivity zones 402a-d, the document scrolls directly along the axis of the respective sensitivity zone 402a-d. For example, when the pointer is within sensitivity zone 402a, the document scrolls to the left directly on the x-axis (i.e., with no vertical component). Likewise, when the pointer 304 is within the sensitivity zone 402c, the document scrolls to the right on the x-axis (i.e., with no vertical component). When the pointer 304 is within the sensitivity zone 402b, the document scrolls downward along the y-axis (i.e., with no horizontal component). When the pointer is within the sensitivity zone 402c, the document scrolls upward along the y-axis (i.e., with no horizontal component).

Figure 5:
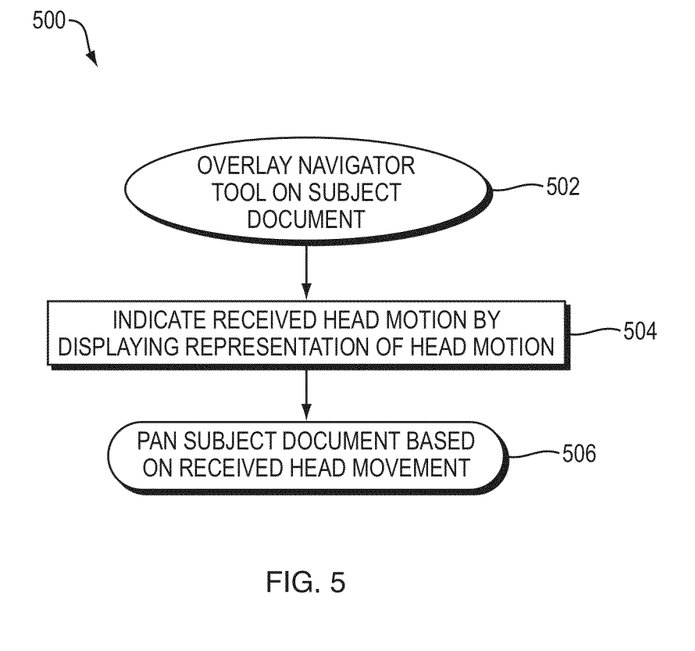
FIG. 5 is a flow diagram illustrating a process employed by an example embodiment of the present invention.

FIG. 5 is a flow diagram 500 illustrating a process employed by an example embodiment of the present invention. The process begins by overlaying a navigator tool on a subject document (502). The process then indicates received head motion by displaying a representation of head motion on the navigator tool (504). The process then pans the subject document based on the received head movement (506).

Figure 6:
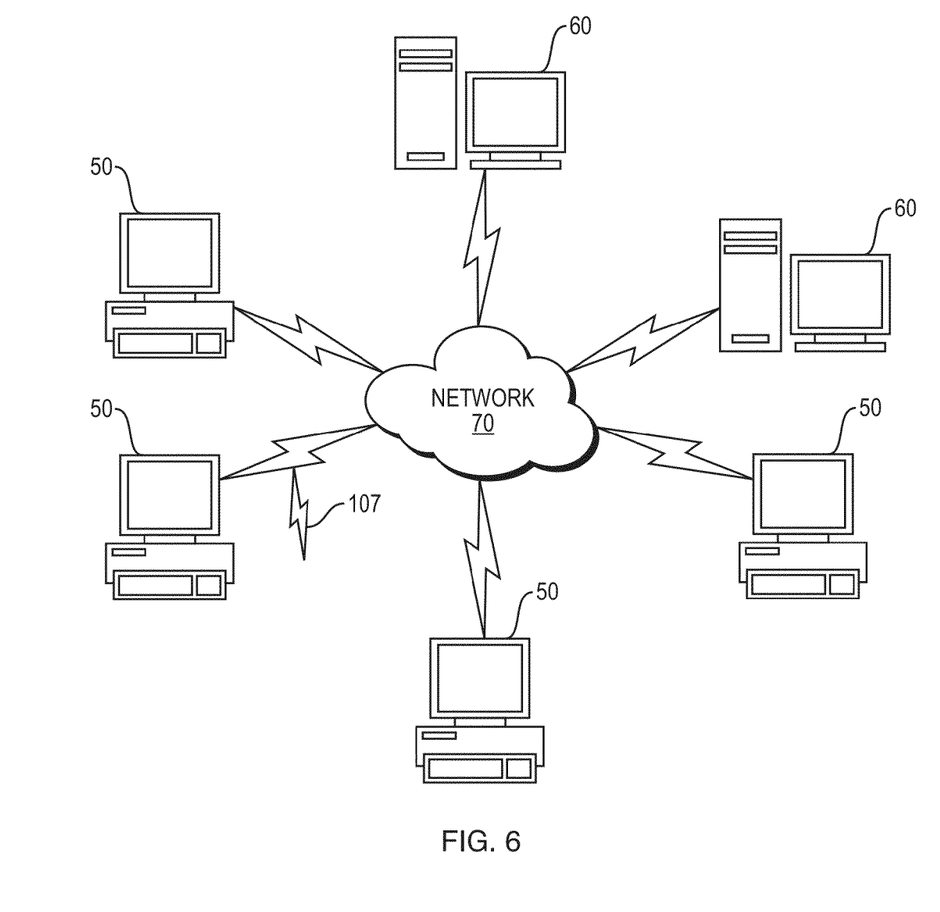
FIG. 6 illustrates a computer network or similar digital processing environment in which the present invention may be implemented.

FIG. 6 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 7:
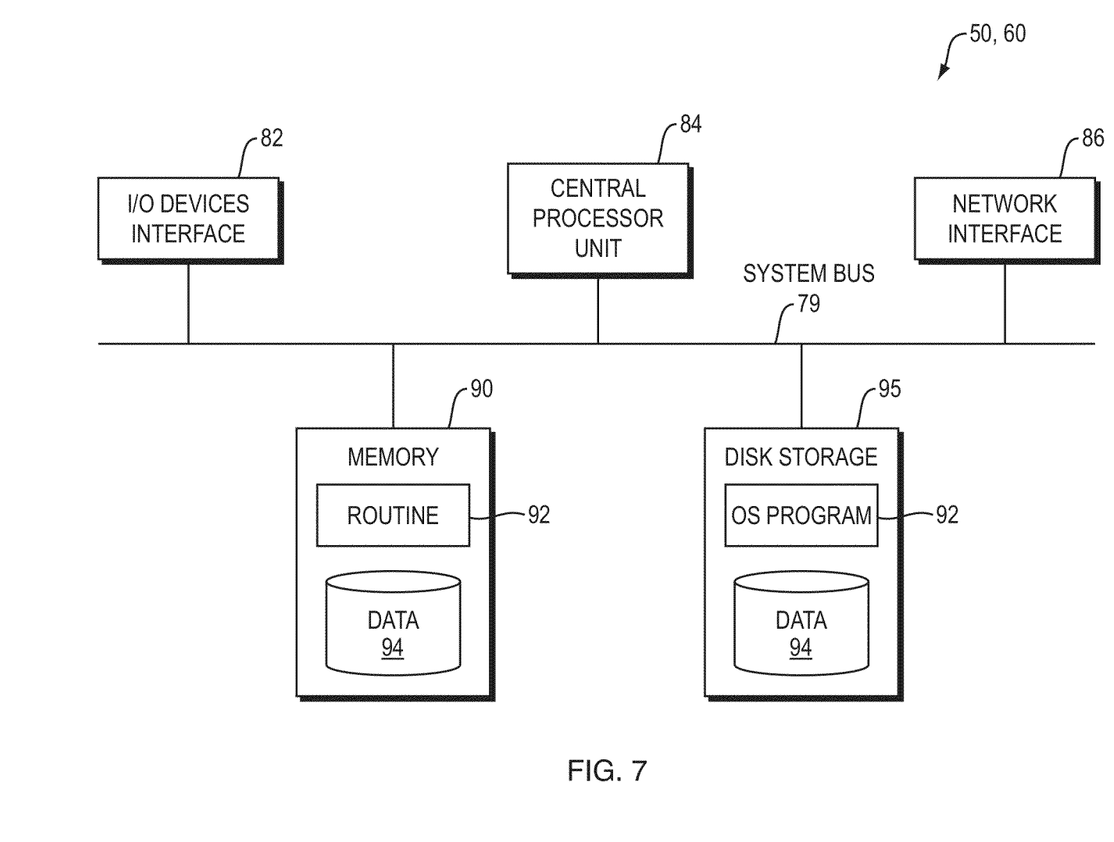
FIG. 7 is a diagram of the internal structure of a computer (e.g., client processor/device or server computers) in the computer system of FIG. 6.

FIG. 7 is a diagram of the internal structure of a computer (e.g., client processor/device 50 or server computers 60) in the computer system of FIG. 6. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 6). Memory 90 provides volatile storage for computer software instructions 92 and data 94 used to implement an embodiment of the present invention (e.g, document navigator code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of controlling document navigation in a headset computer, the method comprising:
   overlaying a navigator tool on a subject document displayed on the headset computer being worn by a user;
   indicating, at the navigator tool and in response to received head movement of the user at the headset computer, a representation of the received head movement; and
   panning the subject document at a speed and in a direction based on the received head movement,
   wherein overlaying the navigator tool includes overlaying an inner boundary and an outer boundary, the inner boundary and outer boundary being concentric circles having different diameters and further overlaying a pointer configured to move within the inner boundary and the outer boundary;

wherein indicating the representation of the received head movement includes indicating the representation by positioning the pointer with respect to the origin of the two circles;

wherein panning the subject document includes panning the subject document at the speed based on a distance from the origin minus a radius of the inner boundary.

2. A method of controlling document navigation in a headset computer, the method comprising:

overlaying a navigator tool on a subject document displayed on the headset computer being worn by a user;

indicating, at the navigator tool and in response to received head movement of the user at the headset computer, a representation of the received head movement; and panning the subject document at a speed and in a direction based on the received head movement, wherein overlaying the navigator tool includes overlaying an inner boundary and an outer boundary, the inner boundary and outer boundary being concentric circles having different diameters and further overlaying a pointer configured to move within the inner boundary and the outer boundary;

wherein indicating the representation of the received head movement includes indicating the representation by positioning the pointer with respect to the origin of the two circles, wherein the panning the subject document includes panning the subject document horizontally when the representation is within a particular threshold of being horizontal, and panning the subject document vertically when the representation is within a particular threshold of being vertical.

3. A system for controlling document navigation in a headset computer, the system comprising:

a display;

a navigator tool module configured to overlay a navigator tool on a subject document displayed on the display of the headset computer being worn by a user, indicate, at the navigator tool and in response to received head movement of the user at the headset computer, a representation of the received head movement, and pan the subject document at a speed and in a direction based on the received head movement, wherein the navigator tool is configured to overlay, to the user over the subject document, an inner boundary and an outer boundary, the inner boundary and outer boundary being concentric circles having different diameters and further overlay a pointer configured to move within the inner boundary and the outer boundary, wherein indicating the representation of the received head movement includes indicating the representation of a position of the pointer with respect to the origin of the two circles, wherein panning the subject document includes panning the subject document at the speed based on a distance from the origin minus a radius of the inner boundary.

4. A system for controlling document navigation in a headset computer, the system comprising:

a display;

a navigator tool module configured to overlay a navigator tool on a subject document displayed on the display of the headset computer being worn by a user, indicate, at the navigator tool and in response to received head movement of the user at the headset computer, a representation of the received head movement, and pan the subject document at a speed and in a direction based on the received head movement, wherein the navigator tool is configured to overlay, to the user over the subject document, an inner boundary and an outer boundary, the inner boundary and outer boundary being concentric circles having different diameters and further overlay a pointer configured to move within the inner boundary and the outer boundary;

wherein indicating the representation of the received head movement includes indicating the representation of a position of the pointer with respect to the origin of the two circles, wherein the panning the subject document includes panning the subject document horizontally when the representation is within a particular threshold of being horizontal, and panning the subject document vertically when the representation is within a particular threshold of being vertical.

* * * * *